(12) United States Patent
Johnson et al.

(10) Patent No.: US 11,149,485 B2
(45) Date of Patent: Oct. 19, 2021

(54) COOKING APPLIANCE HAVING STOWABLE DOUBLE DOORS

(71) Applicants: BSH Home Appliances Corporation, Irvine, CA (US); BSH Hausgeräte GmbH, Munich (DE)

(72) Inventors: Sean Johnson, New Bern, NC (US); Kenneth Jones, Washington, NC (US); Robert Parchman, Newport, NC (US); Stephen Somogy, Newport, NC (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 230 days.

(21) Appl. No.: 16/451,257

(22) Filed: Jun. 25, 2019

(65) Prior Publication Data
US 2020/0408018 A1 Dec. 31, 2020

(51) Int. Cl.
| | |
|---|---|
| E06B 3/50 | (2006.01) |
| E05D 15/58 | (2006.01) |
| E06B 5/00 | (2006.01) |
| F16H 21/44 | (2006.01) |
| F16H 19/00 | (2006.01) |
| E05D 7/00 | (2006.01) |
| F24C 15/02 | (2006.01) |

(52) U.S. Cl.
CPC ............... *E06B 3/509* (2013.01); *E05D 7/00* (2013.01); *E05D 15/581* (2013.01); *E06B 5/00* (2013.01); *F16H 19/001* (2013.01); *F16H 21/44* (2013.01); *F24C 15/026* (2013.01); *E05Y 2900/308* (2013.01)

(58) Field of Classification Search
CPC ..... A47B 88/447; A47B 88/45; F24C 15/026; E06B 3/509; E05D 2015/586
USPC .......... 312/322; 49/104, 107, 109, 116, 122, 49/120
See application file for complete search history.

(56) References Cited

U.S. PATENT DOCUMENTS

| | | | |
|---|---|---|---|
| 2,252,139 A | 8/1941 | Schlacter et al. | |
| 5,657,743 A | 8/1997 | Schwarzbaecker et al. | |
| 7,345,886 B2 * | 3/2008 | Bliven | G06F 1/181 312/223.2 |
| 8,500,224 B2 | 8/2013 | Moeller | |
| 8,510,991 B2 * | 8/2013 | Collene | E05F 1/1066 49/116 |
| 9,254,919 B2 | 2/2016 | Schootstra et al. | |
| 10,018,364 B2 * | 7/2018 | Yantis | F24C 15/023 |
| 2007/0039605 A1 * | 2/2007 | Larsen | F24C 15/023 126/191 |
| 2007/0159037 A1 * | 7/2007 | Hoffman | E05D 15/58 312/322 |

(Continued)

FOREIGN PATENT DOCUMENTS

| | | | | |
|---|---|---|---|---|
| EP | 0848213 A1 | 6/1998 | | |
| EP | 2275635 A2 * | 1/2011 | ............ | E05F 15/643 |

*Primary Examiner* — Marcus Menezes
(74) *Attorney, Agent, or Firm* — Michael E. Tschupp; Andre Pallapies; Brandon G. Braun

(57) ABSTRACT

A cooking appliance may have side-by-side, outwardly-opening doors. The doors may be operatively coupled to each other such that they rotate together and also translate together into respective storage slots on either side of an appliance cavity. Translation into the storage slots may include guiding respective roller carriages of the doors along tracks in the storage slots.

20 Claims, 9 Drawing Sheets

(56) References Cited

U.S. PATENT DOCUMENTS

| | | | |
|---|---|---|---|
| 2010/0139169 A1* | 6/2010 | Patil | F24C 15/02 49/103 |
| 2013/0174831 A1* | 7/2013 | Shaffer | F24C 15/04 126/190 |
| 2015/0300075 A1* | 10/2015 | Lyons | E06B 3/509 312/311 |
| 2019/0284859 A1* | 9/2019 | Rupp | E05D 15/58 |

* cited by examiner

COOKING APPLIANCE HAVING STOWABLE DOUBLE DOORS

FIELD

This disclosure relates to systems and methods for cooking appliances. More specifically, the disclosed embodiments relate to cooking appliances with double doors.

INTRODUCTION

Cooking appliances are integral to kitchen function, but their doors can become dangerous when left open in small or crowded kitchens. Appliance doors may have hot interior surfaces that can be dangerous if unintentionally touched. A user of the appliance may need extended access to and around the appliance cavity during cooking or cleaning tasks. Leaving doors open and unsecured can risk injury to users or bystanders.

SUMMARY

The present disclosure provides systems, apparatuses, and methods relating to cooking appliances having outwardly-opening doors.

In some examples, a cooking appliance may include: an appliance cavity having an open mouth formed in a front face of the appliance; a first door pivotable on a first vertical hinge and a second door pivotable on a second vertical hinge, the first and second doors collectively configured to selectively cover the mouth of the appliance cavity; a first roller carriage disposed in a first slot in the front face of the appliance, the first roller carriage coupled to the first hinge and engaged with a first fixed track oriented orthogonal to the front face of the appliance; a second roller carriage disposed in a second slot in the front face of the appliance, the second roller carriage coupled to the second hinge and engaged with a second fixed track oriented orthogonal to the front face of the appliance; wherein the first and second doors are transitionable between a closed configuration, in which the first and second doors are closed against the front face of the appliance, and a fully open configuration, in which the first and second doors are aligned with the first and second tracks, and transitionable between the fully open configuration and a stowed configuration, in which the first and second doors are at least partially inserted into the respective first and second slots along the first and second tracks; and a rotational coupling mechanism including a first gear assembly coupled to and rotatable with the first hinge and a second gear assembly coupled to and rotatable by the second hinge, wherein the first and second gear assemblies are operatively connected by a mechanical link, such that rotation of the first gear assembly causes rotation of the second gear assembly, and rotating the first door between the closed and fully open configurations automatically causes a corresponding rotation of the second door.

In some examples, a cooking appliance may include: a pair of outwardly-opening side-by-side doors; a first gear assembly coupled to a first vertical hinge disposed on a first side of the appliance, the first hinge coupled to a first roller carriage engaged with a first track oriented transverse to a front face of the appliance; a second gear assembly coupled to a second vertical hinge disposed on a second side of the appliance, the second hinge coupled to a second roller carriage engaged with a second track oriented transverse to the front face of the appliance; a mechanical linkage operatively connecting the first gear assembly and the second gear assembly, such that rotation of the first gear assembly causes a corresponding rotation of the second gear assembly; and a bracket fixing the first roller carriage to the second roller carriage, such that the roller carriages maintain a fixed relative position with respect to each other; wherein the doors are stowable in respective slots on either side of the appliance by opening the doors and transitioning the first and second roller carriages along the respective first and second tracks.

In some examples, a method for operating cooking appliance doors may include: responding to a first force applied to a first door of a cooking appliance by rotating the first door from a closed position to a fully open position; automatically transferring the rotational motion of the first door to a second door of the cooking appliance by way of a rotational coupling mechanism, such that the second door is opened from a closed position to a fully open position; responding to a second force applied to the first door of the cooking appliance by receiving a first roller carriage of the first door into a first slot along a pathway formed by a first track oriented orthogonal to a front face of the appliance, such that the first door is stowed in the first slot; automatically transferring the second force to the second door by way of a bracket fixed at either end to the first roller carriage and to a second roller carriage of the second door, such that the second roller carriage is received into a second slot along a pathway formed by a second track oriented orthogonal to the front face of the appliance and the second door is stowed in the second slot.

Features, functions, and advantages may be achieved independently in various embodiments of the present disclosure, or may be combined in yet other embodiments, further details of which can be seen with reference to the following description and drawings.

DETAILED DESCRIPTION

Figure 1:
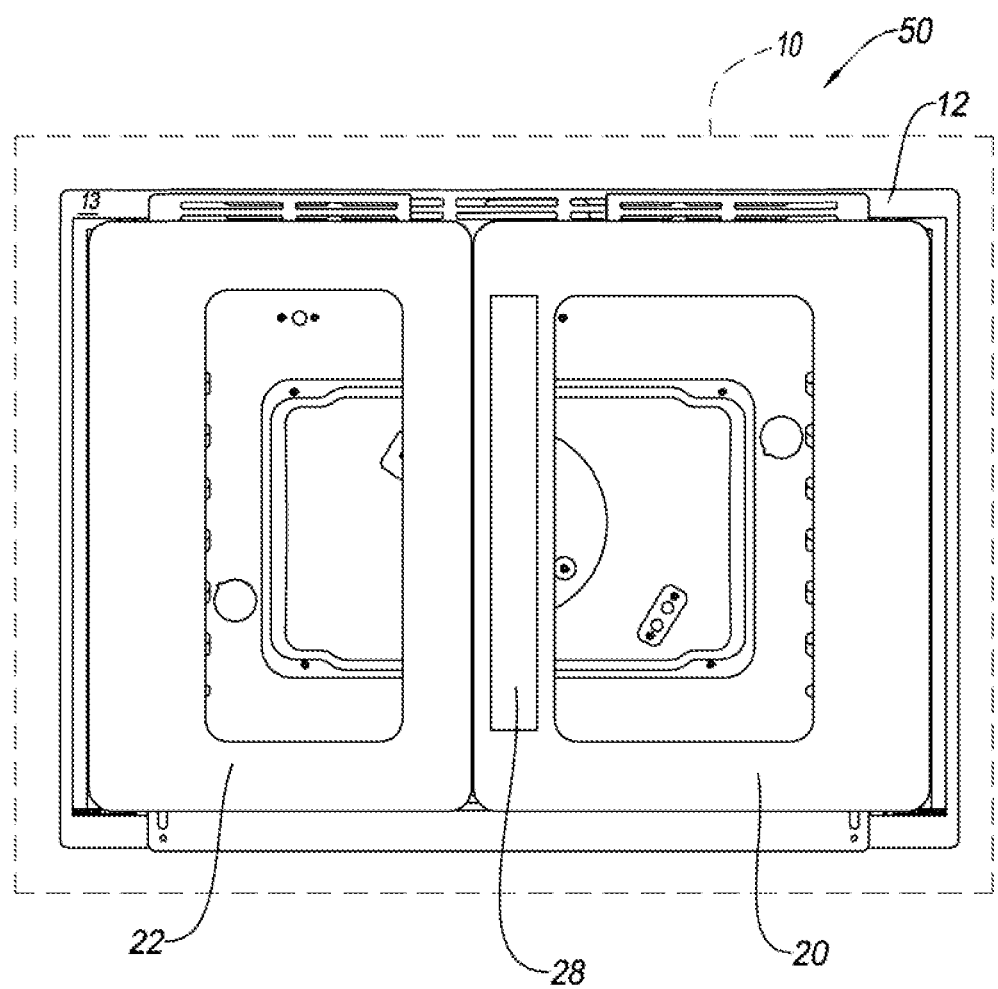
FIG. 1 is a front elevation view of an illustrative cooking appliance including stowable double doors, with the doors shown in a closed configuration.

Various aspects and examples of a cooking appliance including coupled, stowable doors and associated systems and methods are described below and illustrated in the associated drawings. Unless otherwise specified, a cooking appliance in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through C, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"AKA" means "also known as," and may be used to indicate an alternative or corresponding term for a given element or elements.

"Coupled" means connected, either permanently or releasably, whether directly or indirectly through intervening components.

Directional terms such as "up," "down," "vertical," "horizontal," and the like should be understood in the context of the particular object in question. For example, an object may be oriented around defined X, Y, and Z axes. In those examples, the X-Y plane will define horizontal, with up being defined as the positive Z direction and down being defined as the negative Z direction.

Overview

In general, a cooking appliance in accordance with the present teachings may include an appliance body, first and second appliance doors, first and second door retraction mechanisms, and a door coupling mechanism, configured such that both appliance doors may be opened with the use of a single handle and subsequently stowed within hardware compartments included within the appliance body. Stowing the doors in this manner allows for easy maintenance and access to interior contents of the appliance.

The appliance body may include a housing defining an oven cavity. The housing includes an opening on a front surface of the appliance body to facilitate access to the cavity. The housing may further include a hardware compartment defined by an exterior wall of the housing and the body of the cavity. The housing may include a first slot and a second slot on the front surface of the appliance body, configured to permit the doors to pass through the housing and into the hardware compartment.

The first appliance door may be coupled to the appliance body by a first hinge-roller assembly. The second appliance door may be coupled to the appliance body by a second hinge-roller assembly. The first and second appliance doors may be pivotable between an open configuration and a closed configuration about respective hinges of their hinge-roller assemblies. The doors may be orthogonal to the front surface of the appliance body when fully open. The doors may cover the cavity opening in the closed configuration. One or both of the appliance doors may include a handle. One appliance door may include a lip or seal disposed between an interior surface of the other appliance door and the front surface of the appliance body when the doors are closed. This seal may, for example, prevent heat from escaping the cavity when the doors are closed.

The hardware compartment may include rails or tracks configured to receive and guide rollers of the hinge-roller assemblies, thereby defining a roller guide system. The hinge-roller assemblies may each include a carriage, a hinge, and one or more rollers. The hinge may be coupled to an edge of the respective appliance door, and to the carriage. The carriage may comprise a plate or series of plates received within the hardware compartment. Each plate may include one or more rollers.

The rollers of the hinge-roller assembly are received within the rails or tracks, which are disposed in a door storage space of the hardware compartment. This door storage space is made accessible by the housing slots. One or more rollers may be received within each track. Applying force to the hinge-roller assembly directed toward the rear of the appliance may translate the assembly linearly along the track.

Each door is pivotable about the hinge from the closed configuration to the fully open configuration. The door may then be translated along a path defined by the tracks of the roller guide system. Translating the door in this manner causes the door to be received within the appliance housing. Springs and/or pneumatics within the track systems may be included to enable the doors to be self-retracting.

The first and second appliance doors may be interconnected by one or more coupling mechanisms. These coupling mechanisms may include any suitable structures or devices configured to cause the two doors to rotate simultaneously and to translate as a unit into and out of storage.

For example, the coupling mechanism may include a mechanical linkage operatively connecting respective gear assemblies located at one end of each door hinge. For example, the coupling mechanism may include a bar spanning a distance over the cavity and fixing hinge-roller assemblies to each other. The coupling mechanism may pass over or under the appliance cavity walls, such that it can be received within a portion of the hardware compartment above or below the appliance cavity.

In general, a method for stowing two doors of a cooking appliance may include: opening a first appliance door, automatically opening a second appliance door coupled to the first door, and sliding the first and second appliance doors into encased door storage areas through openings the appliance.

Examples, Components, and Alternatives

The following sections describe selected aspects of exemplary cooking appliance as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Cooking Appliance

As shown in FIGS. 1-7, this section describes an illustrative cooking appliance. The illustrative cooking appliance is an example of the cooking appliances described in the Overview above.

FIG. 1 is a view of an illustrative two-door cooking appliance 10 with doors shown in a closed configuration. Cooking appliance 10 may include a range, wall oven, microwave, steam oven, or the like. Cooking appliance 10 includes an appliance housing 12, and an appliance muffle 14 received within appliance housing 12 and defining an appliance cavity 16 (see FIG. 2). An exterior wall of appliance housing 12 and an exterior wall of appliance muffle 14 may collectively define a hardware compartment 18, which substantially surrounds four sides of the cavity.

Appliance cavity 16 is selectively sealed or covered by a first appliance door 20 and a second appliance door 22. First appliance door 20 and second appliance door 22 may each be coupled to appliance housing 12 by a respective hinge-roller assembly 30, at least partially received within hardware compartment 18. Hinge-roller assembly 30 includes a vertical hinge 32 coupled to a carriage 34, and a plurality of rollers 36 mounted on the carriage. Hinge 32 may be coupled to a front edge of carriage 34, and rollers 36 may be coupled to carriage 34. Appliance doors 20 and 22 are pivotable between an open configuration 60 and a closed configuration 50 about hinge 32.

The appliance doors may each have any suitable width, including identical or different widths, such that combined the two doors adequately cover cavity 16 and span the overall width of the appliance. In this example, second appliance door 22 has a lip 26, such that first appliance door 20 overlaps lip 26 of second appliance door 22 when the doors are closed (i.e., in configuration 50). One or both appliance doors may have a handle for manual operation. In this example, first appliance door 20 includes a vertically-oriented handle 28 disposed on a front surface of appliance door 20. Handle 28 is configured to operate first appliance door 20 when pushed or pulled (and to automatically cause the operation of second appliance door 22—see below). The first and second appliance doors may include a seal, gasket, and/or other insulating or sealing device configured to ensure that heat is retained within appliance cavity 16.

Figure 2:
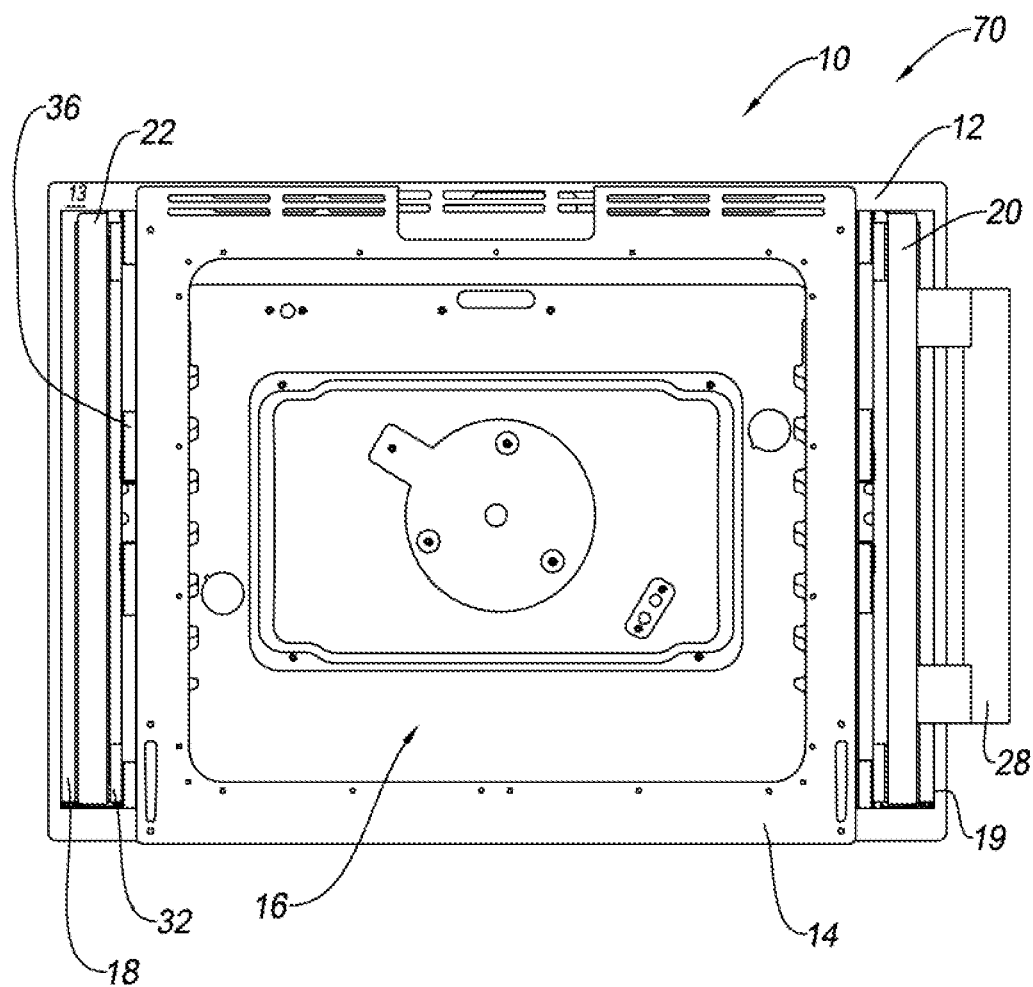
FIG. 2 is a front elevation view of an illustrative two-door cooking appliance cavity included within the appliance of FIG. 1 and including coupled, stowable doors, with the doors shown in a stowed configuration.

FIG. 2 is a front elevation view of cooking appliance 10 in an open and stowed configuration 70. Doors 20 and 22 may be linearly translatable between the fully open configuration, where both doors are orthogonal to a front surface 13 of appliance housing 12 (see FIG. 3), and a stowed configuration, where both doors are received within a door storage area of hardware compartment 18 (see FIG. 4). Appliance housing 12 may include slots 19 adjacent appliance cavity 16, which are configured to provide access for the doors to enter into hardware compartment 18. Accordingly, each slot 19 may have a width suitable for receiving an appliance door therethrough.

Figure 3:
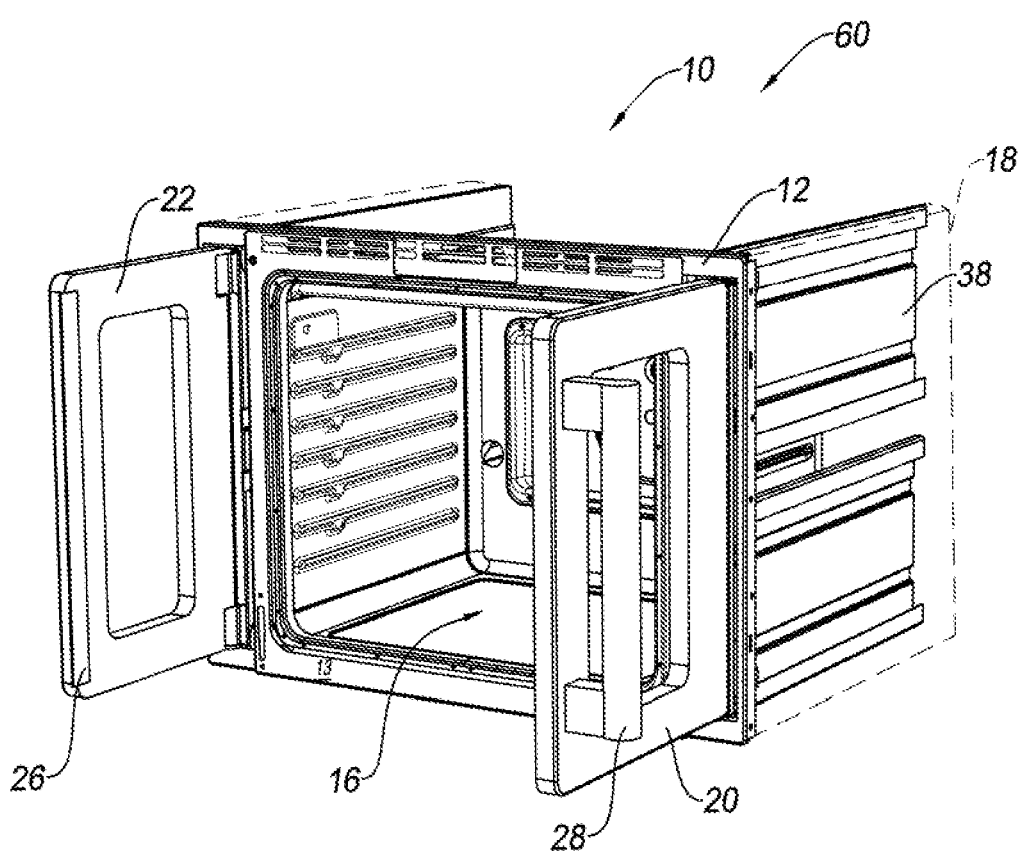
FIG. 3 is a front isometric view of the illustrative two-door cooking appliance cavity of FIG. 2 including coupled, stowable doors, with the doors shown in an open configuration.
Figure 5:
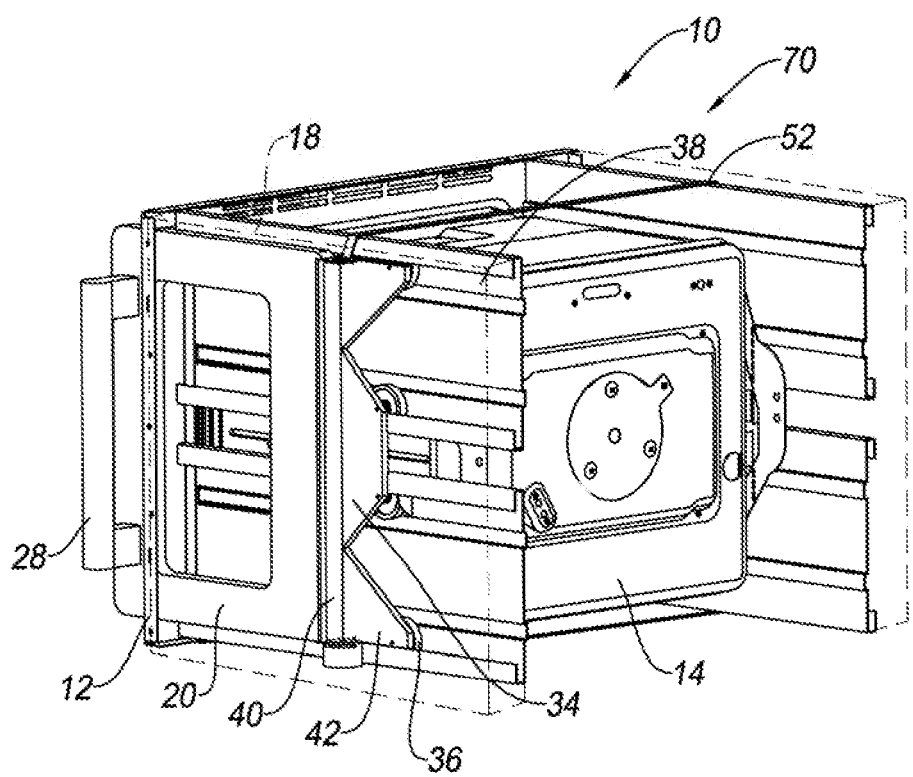
FIG. 5 is a rear isometric view of the illustrative two-door cooking appliance cavity of FIG. 2 including coupled, stowable doors, with the doors shown in a stowed configuration.

FIG. 3 is an isometric view of cooking appliance 10 with doors shown in the fully open configuration. Appliance doors 20 and 22 are orthogonal to front surface 13 of appliance housing 12. Hardware compartment 18 includes rails or tracks 38 running parallel to lateral faces of appliance muffle 14. In some examples, tracks 38 may extend behind appliance muffle 14 and attach to a back face of appliance housing 12. Rollers 36 of hinge-roller assembly may be received within channels of tracks 38, such that doors 20 and 22 are linearly translatable along a horizontal path defined by tracks 38. As best shown in FIG. 5, tracks 38 may have a generally C-shaped cross section.

The bodies of doors 20 and 22 may be configured to abut one or more portions of hinges 32 when the door is in the fully opened position, thereby arresting (i.e., mechanically halting) further movement. For example, the hinges may be situated in rear cutout portions of the doors, such that a front plate of the door hits the hinge to keep the door from rotating beyond a position that is substantially aligned with the path formed by track 38. These abutment portions of the doors may include any suitable structure configured to arrest motion of the door by contacting the hinge and/or front face of the appliance. In the present embodiment, two abutment portions are formed on the corners of each door, adjacent the hinge knuckles. Alternatively, or additionally, more or fewer abutment portions may be formed at any point along the hinge-side edge of the doors. In some examples, the abutment portion includes the entire hinge-side edge of the door, i.e., formed as a single stopping surface.

Figure 4:
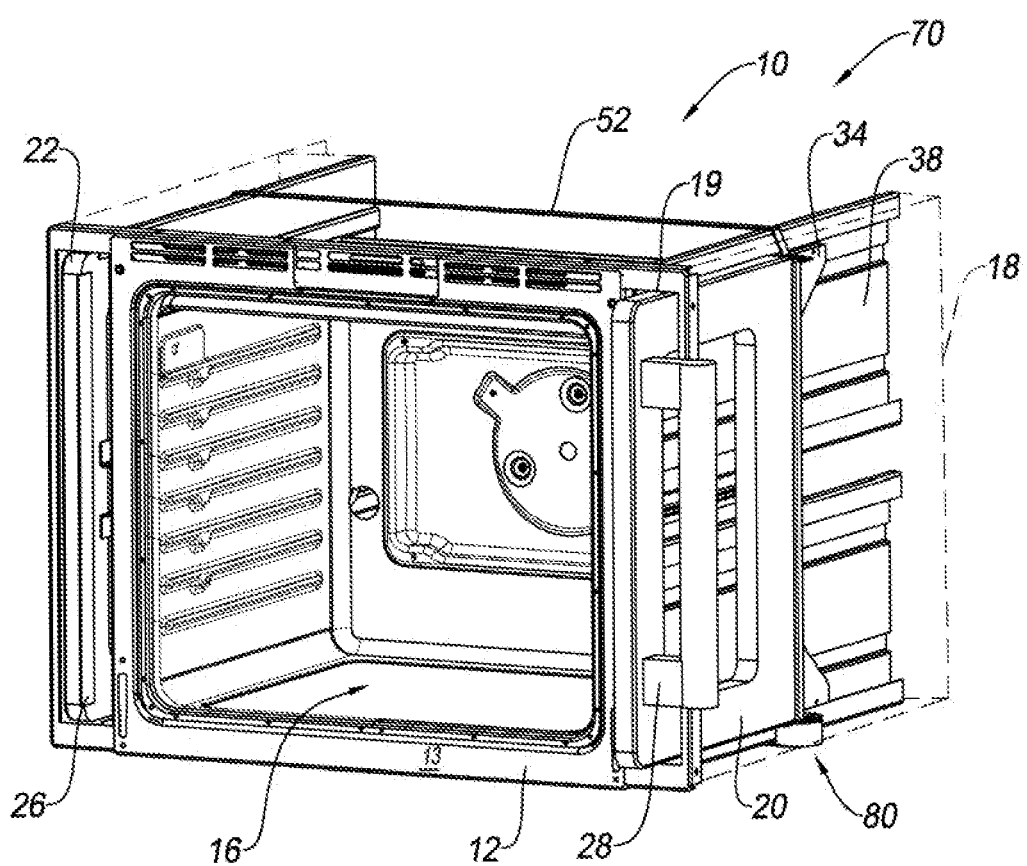
FIG. 4 is a front isometric view of the illustrative two-door cooking appliance cavity of FIG. 2 including coupled, stowable doors, with the doors shown in a stowed configuration.

FIG. 4 is an isometric view of cooking appliance 10 with doors in the stowed configuration. An attachment bar 52 (also referred to as a bracket) extends between top rear portions of opposing carriages of the hinge-roller assemblies, fixing the carriages to each other. Attachment bar 52 is disposed above the tracks, and is configured to interlock doors 20 and 22, such that they travel in and out of the storage space together as a unit, thus ensuring that an exerted force on one of the doors results in movement of both of the doors along the path of tracks 38. Attachment bar 52 is configured to work in tandem with a rotational coupling mechanism 80 on the underside of the apparatus (see below).

FIG. 5 is a rear isometric view of cooking appliance 10 with doors shown in the stowed configuration. Hinge-roller assembly 30 is shown extending from door 20 and received within rails or tracks 38. Carriage 34 of hinge-roller assembly 30 includes a spine 40 and a plurality of roller attachment plates 42, AKA panels. Spine 40 is coupled to hinge 32 such that the door coupled to hinge 32 may pivot independent of spine 40. The carriage may include top and bottom panels, which may be coupled to fixed attachment bar 52, rotational coupling mechanism 80 (see below), and/or any combination thereof. Plates 42 may extend parallel to tracks 38 and may each be coupled to two, three, or any suitable number of rollers received by the channels of tracks 38. A damping mechanism may be included, e.g., having springs, cables, hydraulics, and/or pneumatics configured to slow door movement along tracks 38.

Figure 6:
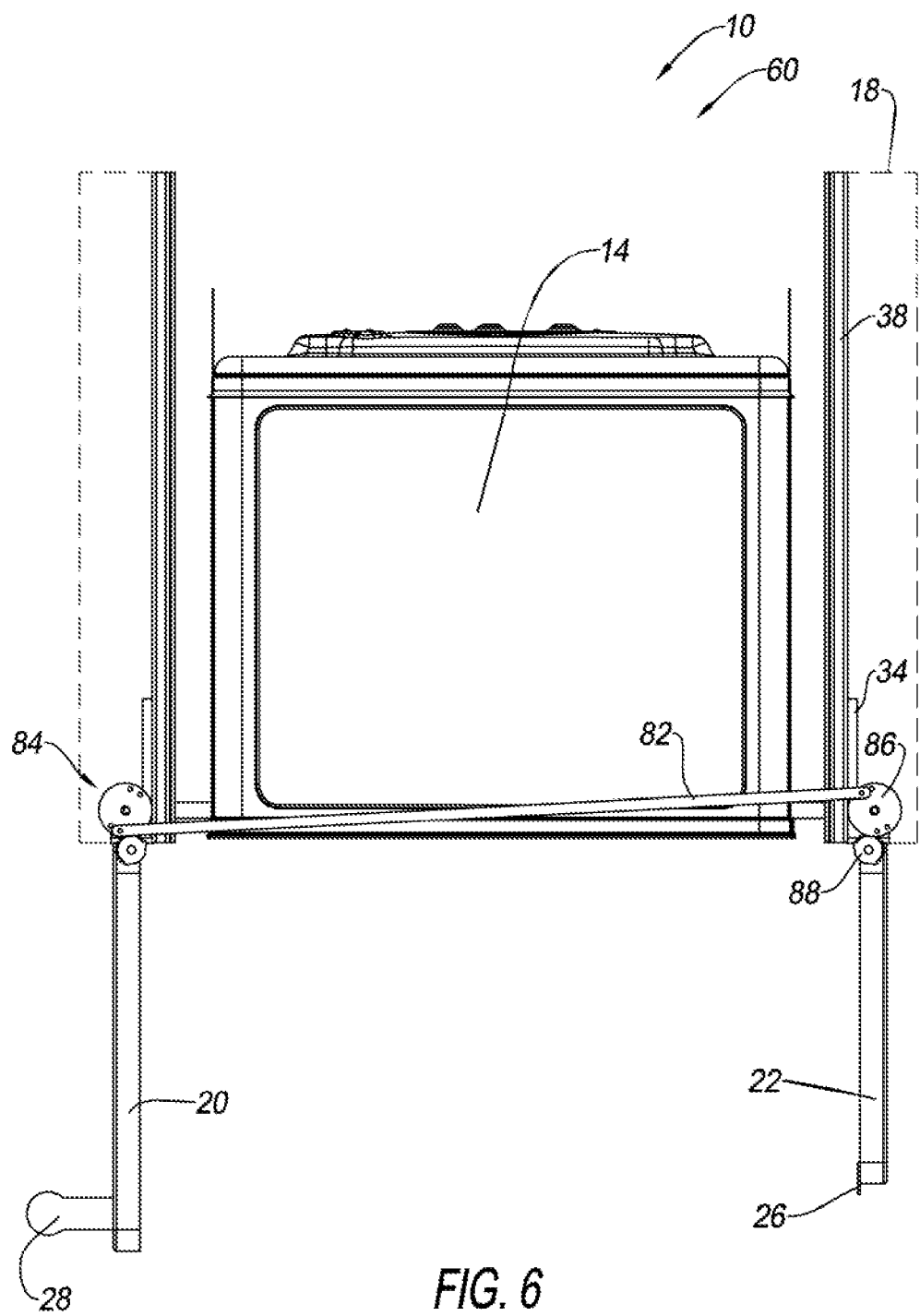
FIG. 6 is a bottom plan view of the illustrative two-door cooking appliance cavity of FIG. 2 including coupled, stowable doors, with the doors shown in an open configuration.
Figure 7:
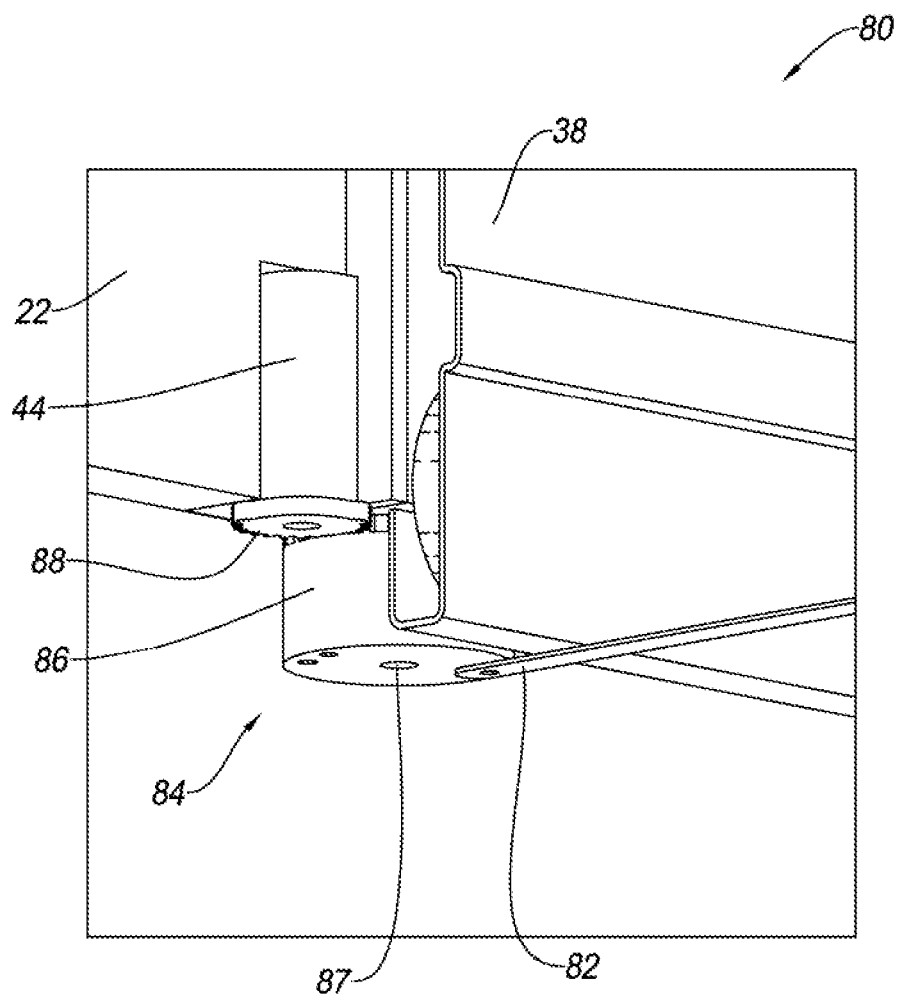
FIG. 7 is a partial view of a door coupling mechanism included within the illustrative two-door cooking appliance of FIG. 1.

FIG. 6 is a bottom plan view of cooking appliance 10 with doors shown in the fully open configuration. FIG. 6 shows rotational coupling mechanism 80 extending across a bottom surface of appliance 10. FIG. 7 is a magnified view of a gear assembly 84 of coupling mechanism 80. Rotational coupling mechanism 80 includes first and second gear assemblies 84 connected by a mechanical link 82. The first gear assembly 84 is operatively connected to one hinge 32 and the second gear assembly 84 is operatively connected to the other hinge 32, such that the gear assemblies rotate with the hinges. Specifically, each gear assembly is configured to rotate with its respective hinge when the doors are opened or closed. For example, the gear assembly may be coaxially fixed to a rotating part of the door hinge.

With continuing reference to FIGS. 6 and 7, each gear assembly 84 includes a mesh gear 86 and a pinion 88, although other suitable gear combinations may be provided. In this example, pinion 88 is coupled to a bottom knuckle 44 of hinge 32, such that causing rotation of pinion 88 pivots the door about its hinge axis, and vice versa. Gear 86, on the other hand, is rotatably coupled to a panel extending from carriage 34 by way of a shaft 87, and intermeshed with pinion 88 such that rotation of gear 86 causes rotation of pinion 88, and vice versa. In some examples, gear 86 and pinion 88 may be substantially the same size. In some examples, the gear and pinion may be of different sizes, such that a gear ratio is other than 1:1. For example, the gear ratio of gear 86 to pinion 88 may be greater than 1:1 (e.g., 2:1 or 3:1), on one or both sides of the appliance.

Furthermore, the two gear assemblies on either side of the appliance are coupled to each other by a mechanical link 82, which is operatively connected to each of gears 86. Mechanical link 82 extends between the first and second gears 86, and is rotatably attached at a periphery of a bottom face of each of the gears. The peripheral rotatable joint between the gear and the coupling bar allows the bar to interlink the gears, such that rotation of one gear 86 results in a corresponding rotation of the other gear 86. In this example, mechanical link 82 is attached to one gear on a side near the associated pinion, and is attached to the other gear on a side away from the associated pinion.

Pinion 88 may comprise a spur gear having protruding teeth at least on the portion of the perimeter of the pinion that contacts gear 86 during normal door motion. Pinion 88 engages with (e.g., meshes with) gear 86 of the gear assembly. Gear 86 may comprise a spur gear, and may include teeth (e.g., formed by recesses in a cylinder) having a face width less than the width of the gear cylinder.

Rotational coupling mechanism 80 is configured to function as follows: opening (or closing) appliance door 20 using handle 28 rotates knuckle 44 of hinge 32. Rotating knuckle 44 of hinge 32 rotates pinion 88 about its axis. Pinion 88 is engaged with gear 86, such that the gear rotates a corresponding amount. As gear 86 rotates, the local end of mechanical link 82 is displaced with the rotation, transferring the angular motion of gear 86 across to the other gear 86. This other gear 86 rotates, causing the other pinion 88 to rotate. Rotating the other pinion 88 rotates the other knuckle 44 about the hinge axis, causing second appliance door 22 to open (or close). First appliance door 20 and second appliance door 22 can therefore be opened or closed with a single action by a user of the cooking appliance.

First and second appliance door 20 and 22 may be stowed after being transitioned to open configuration 60. Pushing one of the first and second appliance doors 20 and 22 toward a back side of the cooking appliance causes both doors to be stowed, because first and second carriages 34 are affixed to each other at the top end by fixed attachment bar 52, and at the lower end by rotational coupling mechanism 80.

B. Illustrative Methods

Figure 8:
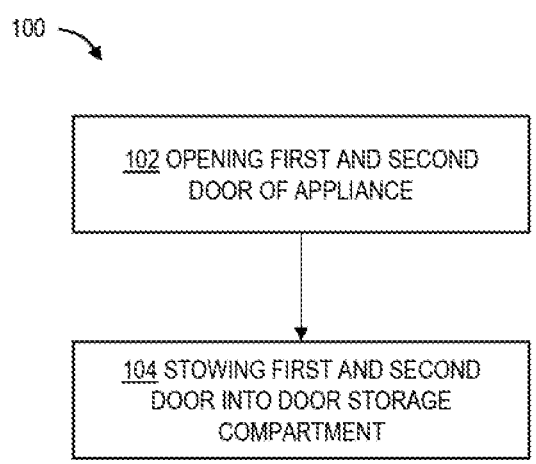
FIG. 8 is a flow chart depicting steps of an illustrative method for stowing cooking appliance doors.
Figure 9:
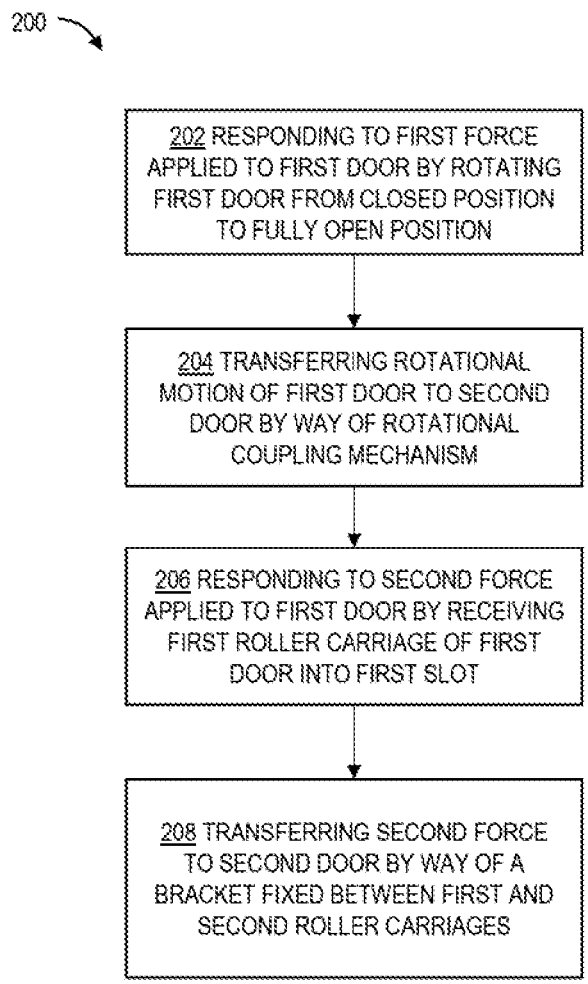
FIG. 9 is a flow chart depicting steps of an illustrative method for operating cooking appliance doors.

This section describes steps of illustrative methods 100 and 200 for opening and stowing double doors of a cooking appliance; see FIGS. 8 and 9. Aspects of the illustrative cooking appliance described above may be utilized in the method steps below. Where appropriate, reference may be made to components and systems that may be used in carrying out each step. These references are for illustration, and are not intended to limit the possible ways of carrying out any particular step of the method.

FIG. 8 is a flowchart illustrating steps performed in an illustrative method, and may not recite the complete process or all steps of the method. Although various steps of method 100 are described below and depicted in FIG. 8, the steps need not necessarily all be performed, and in some cases may be performed simultaneously or in a different order than the order shown.

At step 102, a user of the cooking appliance opens a first and second door of the appliance. Opening the first and second door may include using a single handle disposed on a front surface of the first appliance door to transition both doors from a closed configuration to an open configuration. The first and second appliance doors may be coupled by a rotational coupling mechanism that transfers rotational motion from the first door to the second door (and vice versa), allowing the doors to be opened simultaneously or semi-simultaneously. The coupling mechanism may include gears, cables, springs, or any other combination of connecting mechanisms that allow for the second door to open in response to actions performed on the first door. Opening the first and second door may also be performed separately. Opening the first and second door may alternatively include using a human-machine interface (e.g. a button, toggle, switch, or control panel) to initiate the opening of the doors.

At step 104, a user of the cooking appliance stows the first and second door into a door storage compartment. Stowing the first and second door into the compartment may include pushing one or both of the first and second doors toward the rear of the appliance. Pushing one of the appliance doors toward the rear of the appliance may cause both doors to move into the hardware compartment, as the doors are coupled at their top ends and/or bottom ends. Both doors may be coupled by the fixed attachment bar and/or the rotational coupling mechanism described above. The doors may also be coupled by cables, bars, or any type of linkage that ensures paired linear movement. Stowing the first and second door may alternatively include using a human-machine interface (e.g., a button, toggle, switch, or control panel) to initiate the stowing of the doors.

FIG. 9 is a flowchart illustrating steps performed in an illustrative method, and may not recite the complete process or all steps of the method. Although various steps of method 200 are described below and depicted in FIG. 9, the steps need not necessarily all be performed, and in some cases may be performed simultaneously or in a different order than the order shown.

Step 202 includes responding to a first force applied to a first door of a cooking appliance by rotating the first door from a closed position to a fully open position.

Step 204 includes automatically transferring the rotational motion of the first door to a second door of the cooking appliance by way of a rotational coupling mechanism, such that the second door is opened from a closed position to a fully open position. In some examples, the rotational coupling mechanism comprises a first gear assembly coupled to a first hinge of the first door, a second gear assembly coupled to a second hinge of the second door, and a mechanical linkage operatively connecting the first and second gear assemblies to each other, such that the rotational motion of the first door is automatically transferred to the second door. In some examples, the mechanical linkage passes under an appliance cavity disposed behind the doors. In some examples, the first and second hinges are disposed on opposite sides of the appliance cavity.

Step 206 includes responding to a second force applied to the first door of the cooking appliance by receiving a first roller carriage of the first door into a first slot along a pathway formed by a first track oriented orthogonal to a front face of the appliance, such that the first door is stowed in the first slot.

Step 208 includes automatically transferring the second force to the second door by way of a bracket fixed at either end to the first roller carriage and to a second roller carriage of the second door, such that the second roller carriage is received into a second slot along a pathway formed by a second track oriented orthogonal to the front face of the appliance and the second door is stowed in the second slot. In some examples, the first and second tracks are oriented parallel to each other and disposed on opposite sides of the appliance cavity.

C. Illustrative Combinations and Additional Examples

This section describes additional aspects and features of a cooking appliance including coupled, stowable doors, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A cooking appliance comprising:

an appliance cavity having an open mouth formed in a front face of the appliance;

a first door pivotable on a first vertical hinge and a second door pivotable on a second vertical hinge, the first and second doors collectively configured to selectively cover the mouth of the appliance cavity;

a first roller carriage disposed in a first slot in the front face of the appliance, the first roller carriage coupled to the first hinge and engaged with a first fixed track oriented orthogonal to the front face of the appliance;

a second roller carriage disposed in a second slot in the front face of the appliance, the second roller carriage coupled to the second hinge and engaged with a second fixed track oriented orthogonal to the front face of the appliance;

wherein the first and second doors are transitionable between a closed configuration, in which the first and second doors are closed against the front face of the appliance, and a fully open configuration, in which the first and second doors are aligned with the first and second tracks, and transitionable between the fully open configuration and a stowed configuration, in which the first and second doors are at least partially inserted into the respective first and second slots along the first and second tracks; and a rotational coupling mechanism including a first gear assembly coupled to and rotatable with the first hinge and a second gear assembly coupled to and rotatable by the second hinge, wherein the first and second gear assemblies are operatively connected by a mechanical link, such that rotation of the first gear assembly causes rotation of the second gear assembly, and rotating the first door between the closed and fully open configurations automatically causes a corresponding rotation of the second door.

A1. The cooking appliance of A0, wherein the mechanical link comprises a solid bar.

A2. The cooking appliance of A0 or A1, wherein the mechanical link passes under the appliance cavity.

A3. The cooking appliance of any one of paragraphs A0 through A2, wherein the first and second hinges are disposed on opposite sides of the appliance cavity.

A4. The cooking appliance of any one of paragraphs A0 through A3, wherein the first door comprises a handle.

A5. The cooking appliance of A4, wherein the handle remains exterior to the first slot when the first and second doors are in the stowed configuration.

A6. The cooking appliance of any one of paragraphs A0 through A5, wherein the first and second tracks are oriented parallel to each other and disposed on opposite sides of the appliance cavity.

A7. The cooking appliance of any one of paragraphs A0 through A6, further comprising a bracket, ends of which are fixed to the first and second roller carriages, such that the first and second doors translate together in a direction defined by the first and second tracks, and transitioning the first door between the fully open configuration and the stowed configuration automatically causes a corresponding transition of the second door. A8. The cooking appliance of any one of paragraphs A0 through A7, each of the first and second appliance doors further comprising an abutment portion configured to arrest the door in the fully open configuration by coming into contact with the vertical hinge.

B0. A cooking appliance comprising:

a pair of outwardly-opening side-by-side doors;

a first gear assembly coupled to a first vertical hinge disposed on a first side of the appliance, the first hinge coupled to a first roller carriage engaged with a first track oriented transverse to a front face of the appliance;

a second gear assembly coupled to a second vertical hinge disposed on a second side of the appliance, the second hinge coupled to a second roller carriage engaged with a second track oriented transverse to the front face of the appliance;

a mechanical linkage operatively connecting the first gear assembly and the second gear assembly, such that rotation of the first gear assembly causes a corresponding rotation of the second gear assembly; and a bracket fixing the first roller carriage to the second roller carriage, such that the roller carriages maintain a fixed relative position with respect to each other;

wherein the doors are stowable in respective slots on either side of the appliance by opening the doors and transitioning the first and second roller carriages along the respective first and second tracks.

B1. The cooking appliance of B0, wherein each of the first and second gear assemblies comprises a pair of intermeshed spur gears, and the mechanical linkage comprises a solid bar pivotably coupled to one of the spur gears of the first gear assembly and to one of the spur gears of the second gear assembly.

B2. The cooking appliance of B0 or B1, wherein the mechanical linkage passes under an appliance cavity disposed behind the doors.

B3. The cooking appliance of B2, wherein the first and second hinges are disposed on opposite sides of the appliance cavity.

B4. The cooking appliance of B2, wherein the first and second tracks are oriented parallel to each other and disposed on opposite sides of the appliance cavity.

B5. The cooking appliance of any one of paragraphs B0 through B4, wherein one of the doors has a handle.

B6. The cooking appliance of B5, wherein the handle remains exterior to the slot when the doors are stowed.

B7. The cooking appliance of any one of paragraphs B0 through B6, each of the doors further comprising an abutment portion configured to arrest the door by coming into contact with the respective hinge when the door is in alignment with the respective track.

C0. A method for operating cooking appliance doors, the method comprising:

responding to a first force applied to a first door of a cooking appliance by rotating the first door from a closed position to a fully open position;

automatically transferring the rotational motion of the first door to a second door of the cooking appliance by way of a rotational coupling mechanism, such that the second door is opened from a closed position to a fully open position;

responding to a second force applied to the first door of the cooking appliance by receiving a first roller carriage of the first door into a first slot along a pathway formed by a first track oriented orthogonal to a front face of the appliance, such that the first door is stowed in the first slot;

automatically transferring the second force to the second door by way of a bracket fixed at either end to the first roller carriage and to a second roller carriage of the second door, such that the second roller carriage is received into a second slot along a pathway formed by a second track oriented orthogonal to the front face of the appliance and the second door is stowed in the second slot.

C1. The method of C0, wherein the rotational coupling mechanism comprises a first gear assembly coupled to a first hinge of the first door, a second gear assembly coupled to a second hinge of the second door, and a mechanical linkage operatively connecting the first and second gear assemblies to each other, such that the rotational motion of the first door is automatically transferred to the second door.

C2. The method of C1, wherein the mechanical linkage passes under an appliance cavity disposed behind the doors.

C3. The method of C2, wherein the first and second hinges are disposed on opposite sides of the appliance cavity.

C4. The method of C2, wherein the first and second tracks are oriented parallel to each other and disposed on opposite sides of the appliance cavity.

C5. The method of any one of paragraphs C0 through C4, further comprising arresting each of the doors in the fully open position by contacting a hinge of the door with an abutment portion of the door.

Advantages, Features, and Benefits

The different embodiments and examples of the cooking appliance described herein provide several advantages over known solutions for securing loose appliance doors. For example, illustrative embodiments and examples described herein allow a user of the appliance to open a two-door appliance using a single hand and a single motion.

Additionally, and among other benefits, illustrative embodiments and examples described herein allow for two appliance doors to be stowed by a user in a single motion. This may protect the user from burns or other injuries caused by unsecured oven doors.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A cooking appliance comprising:
   an appliance cavity having an open mouth formed in a front face of the appliance;
   a first door pivotable on a first vertical hinge and a second door pivotable on a second vertical hinge, the first and second doors collectively configured to selectively cover the mouth of the appliance cavity;
   a first roller carriage disposed in a first slot in the front face of the appliance, the first roller carriage coupled to the first hinge and engaged with a first fixed track oriented orthogonal to the front face of the appliance;
   a second roller carriage disposed in a second slot in the front face of the appliance, the second roller carriage coupled to the second hinge and engaged with a second fixed track oriented orthogonal to the front face of the appliance;
   wherein the first and second doors are transitionable between a closed configuration, in which the first and second doors are closed against the front face of the appliance, and a fully open configuration, in which the first and second doors are aligned with the first and second tracks, and transitionable between the fully open configuration and a stowed configuration, in which the first and second doors are at least partially inserted into the respective first and second slots along the first and second tracks; and
   a rotational coupling mechanism including a first gear assembly coupled to and rotatable with the first hinge and a second gear assembly coupled to and rotatable by the second hinge, wherein the first and second gear assemblies are operatively connected by a mechanical link, such that rotation of the first gear assembly causes rotation of the second gear assembly, and rotating the first door between the closed and fully open configurations automatically causes a corresponding rotation of the second door.

2. The cooking appliance of claim 1, wherein the mechanical link comprises a solid bar.

3. The cooking appliance of claim 1, wherein the mechanical link passes under the appliance cavity.

4. The cooking appliance of claim 1, wherein the first and second hinges are disposed on opposite sides of the appliance cavity.

5. The cooking appliance of claim 1, wherein the first door comprises a handle.

6. The cooking appliance of claim 5, wherein the handle remains exterior to the first slot when the first and second doors are in the stowed configuration.

7. The cooking appliance of claim 1, wherein the first and second tracks are oriented parallel to each other and disposed on opposite sides of the appliance cavity.

8. The cooking appliance of claim 1, further comprising a bracket, ends of which are fixed to the first and second roller carriages, such that the first and second doors translate together in a direction defined by the first and second tracks, and transitioning the first door between the fully open configuration and the stowed configuration automatically causes a corresponding transition of the second door.

9. A cooking appliance comprising:
a pair of outwardly-opening side-by-side doors;
a first gear assembly coupled to a first vertical hinge disposed on a first side of the appliance, the first hinge coupled to a first roller carriage engaged with a first track oriented transverse to a front face of the appliance;
a second gear assembly coupled to a second vertical hinge disposed on a second side of the appliance, the second hinge coupled to a second roller carriage engaged with a second track oriented transverse to the front face of the appliance;
a mechanical linkage operatively connecting the first gear assembly and the second gear assembly, such that rotation of the first gear assembly causes a corresponding rotation of the second gear assembly; and
a bracket fixing the first roller carriage to the second roller carriage, such that the roller carriages maintain a fixed relative position with respect to each other;
wherein the doors are stowable in respective slots on either side of the appliance by opening the doors and transitioning the first and second roller carriages along the respective first and second tracks.

10. The cooking appliance of claim 9, wherein each of the first and second gear assemblies comprises a pair of intermeshed spur gears, and the mechanical linkage comprises a solid bar pivotably coupled to one of the spur gears of the first gear assembly and to one of the spur gears of the second gear assembly.

11. The cooking appliance of claim 9, wherein the mechanical linkage passes under an appliance cavity disposed behind the doors.

12. The cooking appliance of claim 11, wherein the first and second hinges are disposed on opposite sides of the appliance cavity.

13. The cooking appliance of claim 11, wherein the first and second tracks are oriented parallel to each other and disposed on opposite sides of the appliance cavity.

14. The cooking appliance of claim 9, wherein one of the doors has a handle.

15. The cooking appliance of claim 14, wherein the handle remains exterior to the slots when the doors are stowed.

16. A method for operating cooking appliance doors, the method comprising:
responding to a first force applied to a first door of a cooking appliance by rotating the first door from a closed position to a fully open position;
automatically transferring the rotational motion of the first door to a second door of the cooking appliance by way of a rotational coupling mechanism, such that the second door is opened from a closed position to a fully open position;
responding to a second force applied to the first door of the cooking appliance by receiving a first roller carriage of the first door into a first slot along a pathway formed by a first track oriented orthogonal to a front face of the appliance, such that the first door is stowed in the first slot;
automatically transferring the second force to the second door by way of a bracket fixed at either end to the first roller carriage and to a second roller carriage of the second door, such that the second roller carriage is received into a second slot along a pathway formed by a second track oriented orthogonal to the front face of the appliance and the second door is stowed in the second slot.

17. The method of claim 16, wherein the rotational coupling mechanism comprises a first gear assembly coupled to a first hinge of the first door, a second gear assembly coupled to a second hinge of the second door, and a mechanical linkage operatively connecting the first and second gear assemblies to each other, such that the rotational motion of the first door is automatically transferred to the second door.

18. The method of claim 17, wherein the mechanical linkage passes under an appliance cavity disposed behind the doors.

19. The method of claim 18, wherein the first and second hinges are disposed on opposite sides of the appliance cavity.

20. The method of claim 18, wherein the first and second tracks are oriented parallel to each other and disposed on opposite sides of the appliance cavity.

* * * * *